US010769421B2

(12) United States Patent
Hua et al.

(10) Patent No.: US 10,769,421 B2
(45) Date of Patent: Sep. 8, 2020

(54) METHOD FOR PERFORMING PEDESTRIAN DETECTION WITH AID OF LIGHT DETECTION AND RANGING

(71) Applicant: National Chung-Shan Institute of Science and Technology, Taoyuan (TW)

(72) Inventors: Kai-Lung Hua, Taipei (TW); Shih-Che Chien, Hsinchu (TW); Feng-Chia Chang, Taoyuan (TW); Hsueh-Ling Tang, Taipei (TW); Chien-Hao Hsiao, Hsinchu (TW); Yu-Sung Hsiao, Taoyuan (TW)

(73) Assignee: National Chung-Shan Institute of Science and Technology, Taoyuan (TW)

( * ) Notice: Subject to any disclaimer, the term of this patent is extended or adjusted under 35 U.S.C. 154(b) by 92 days.

(21) Appl. No.: 16/059,013

(22) Filed: Aug. 8, 2018

(65) Prior Publication Data

US 2019/0163968 A1 May 30, 2019

(30) Foreign Application Priority Data

Nov. 30, 2017 (TW) .............................. 106141953 A

(51) Int. Cl.
*G06K 9/00* (2006.01)
*G01S 17/89* (2020.01)
(Continued)

(52) U.S. Cl.
CPC .......... *G06K 9/00369* (2013.01); *G01S 17/04* (2020.01); *G01S 17/89* (2013.01);
(Continued)

(58) Field of Classification Search
CPC ...................... G06K 9/00362; G06K 9/00805
See application file for complete search history.

(56) References Cited

U.S. PATENT DOCUMENTS 9,286,538 B1 * 3/2016 Chen .................. G06K 9/00208
2011/0282581 A1 * 11/2011 Zeng ..................... G01S 17/936
701/301
(Continued)

OTHER PUBLICATIONS

Kidono et al., "Pedestrian Recognition Using High-definition LIDAR", 2011 IEEE Intelligent Vehicles Symposium (IV), Jun. 5-9, 2011, pp. 405-410 (Year: 2011).*

*Primary Examiner* — Nay A Maung
*Assistant Examiner* — Jose M Torres
(74) *Attorney, Agent, or Firm* — Winston Hsu

(57) ABSTRACT

A method for performing pedestrian detection with aid of light detection and ranging (LIDAR) is provided. The method includes: obtaining 3-dimensional (3D) point cloud data through the LIDAR; performing ground separation processing on the 3D point cloud data to remove ground information; performing object extraction processing on the 3D point cloud data to obtain 3D point cloud chart that includes pedestrian candidate point cloud group; performing 2-dimensional (2D) mapping processing on the 3D point cloud chart to obtain 2D chart; and extracting 3D feature and 2D feature from the 3D point cloud chart and the 2D chart, respectively, and utilizing the 3D feature and the 2D feature to determine location of the pedestrian. According to the method, image data obtained by the LIDAR may be enhanced, the method may distinguish between pedestrian far away and environment blocks, and pedestrian recognition in nighttime or in bad weather may be improved.

7 Claims, 3 Drawing Sheets

(51) Int. Cl.
    *G06T 7/73*         (2017.01)
    *G06K 9/46*         (2006.01)
    *G06K 9/40*         (2006.01)
    *G06K 9/62*         (2006.01)
    *G01S 17/04*       (2020.01)

(52) U.S. Cl.
    CPC ..... *G06K 9/00362* (2013.01); *G06K 9/00805* (2013.01); *G06K 9/40* (2013.01); *G06K 9/4604* (2013.01); *G06K 9/6268* (2013.01); *G06T 7/73* (2017.01); *G06T 2207/10028* (2013.01); *G06T 2207/20036* (2013.01); *G06T 2207/20081* (2013.01); *G06T 2207/30196* (2013.01)

(56) References Cited

U.S. PATENT DOCUMENTS

| | | | |
|---|---|---|---|
| 2014/0184798 A1* | 7/2014 | Wedajo | G06K 9/00791 348/148 |
| 2016/0117571 A1* | 4/2016 | Othmezouri | G06K 9/00369 382/165 |
| 2016/0154999 A1* | 6/2016 | Fan | G06K 9/00201 382/103 |
| 2018/0074203 A1* | 3/2018 | Zermas | G05D 1/0088 |
| 2019/0096086 A1* | 3/2019 | Xu | G06K 9/4628 |
| 2019/0147245 A1* | 5/2019 | Qi | G06K 9/00664 382/103 |

\* cited by examiner

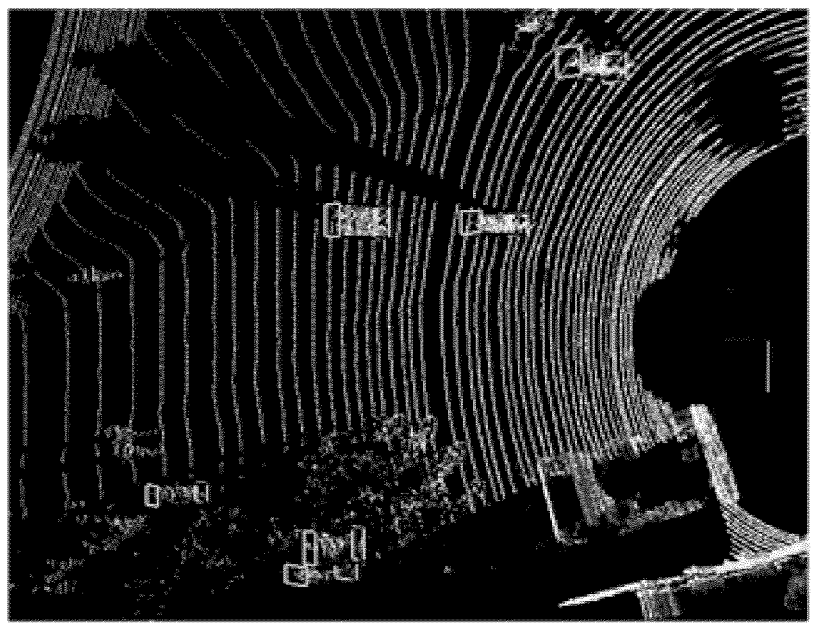
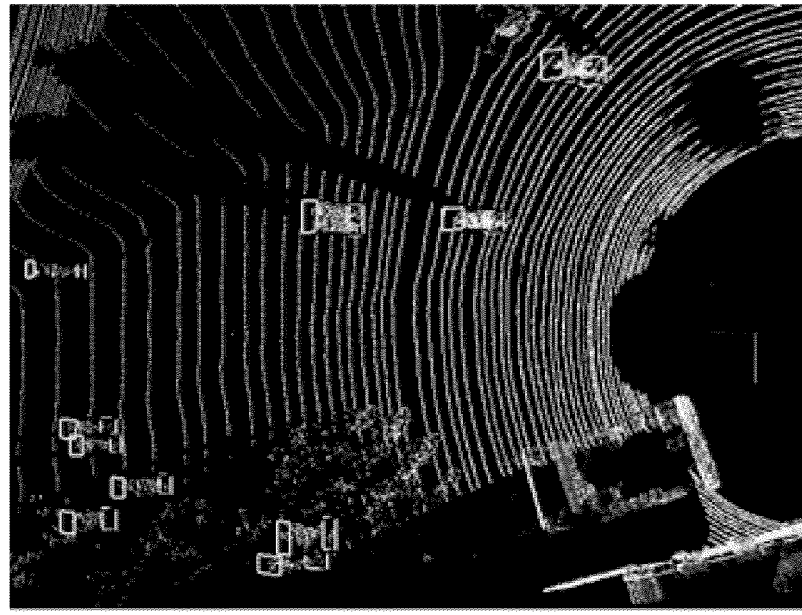
FIG. 3

METHOD FOR PERFORMING PEDESTRIAN DETECTION WITH AID OF LIGHT DETECTION AND RANGING

BACKGROUND OF THE INVENTION

1. Field of the Invention

The present invention is related to an image processing method, more particularly, to a method for performing pedestrian detection with aid of light detection and ranging (LIDAR).

2. Description of the Prior Art

Related art of image processing is a popular issue in academe and industry. More particularly, related art of pedestrian detection for automobiles and street monitors is widely applied, where the detecting targets are pedestrians, in order to inform a driver or make related safety program to determine locations of the pedestrians, to perform related reaction for safety.

In a nighttime environment, the pedestrians have to rely on street lamps, automobile headlights or illumination provided by stores along the street for being seen and being detected. However, when the external environment (e.g., heavy rain or heavy fog) makes visibility poor, detection of pedestrian locations becomes difficult. Although the related art utilizes infrared detection system for pedestrian detection in nighttime, most of machines utilized for the infrared detection system are expensive and have big sizes and large power consumption. As a result, the infrared detection system is hard to be widely utilized for detecting pedestrian locations.

Light detection and ranging (LIDAR) is an optical remote sensing technology. A LIDAR system may be divided into three parts, including a laser emitter, scanning and optical components, and photosensitive components, where the laser emitter may emit laser beam with a wavelength in the range of 600 nm-1000 nm, and the scanning and optical components are arranged to collect distances and angles of reflection points, and the photosensitive components are arranged to detect intensity of reflected light. Thus, the LIDAR system is a measuring apparatus that utilizes laser scanning technology to obtain 3D coordinate data quickly and accurately, where the data generated by the LIDAR system may comprise three-dimensional (3D) coordinates and laser reflecting intensity values of a great number of scanning points, which may be referred to as 3D point cloud data.

However, precision of the data generated by the LIDAR system is usually affected by external environment. For example, suspended solids in the air may affect light speed. For another example, the precision of the data generated by the LIDAR system may be affected by heavy fog and heavy rain, especially the heavy rain. When the rain becomes heavier, chance of collision between the laser beam and raindrops may greatly increase. In the situation that extreme weather such as pouring rain becomes normal recently, the farthest detectable distance of the LIDAR system linearly declines, thus degrading the practicality of the LIDAR system.

Thus, a novel method for performing pedestrian detection with aid of LIDAR is needed to enhance texture features through image processing in order to avoid influences of external poor environment and problems such as measuring distance being too long. According to the method of the present invention, the precision may be improved without greatly increasing additional costs such as reform costs for hardware equipment, and ability for recognizing pedestrians can be enhanced to achieve the objective of improving safety of pedestrians.

SUMMARY OF THE INVENTION

Based on the aforementioned disadvantages of related art, an objective of the present invention is to provide a method for performing pedestrian detection with aid of light detection and ranging (LIDAR), in combination of a LIDAR system, 3-dimensional (3D) point cloud data, object extraction processing, and 3D and 2-dimensional feature extraction, to enhance a pedestrian image within the 3D point cloud data generated by the LIDAR system.

In order to achieve the aforementioned objective, according to a scheme proposed by the present invention, a method for performing pedestrian detection with aid of light detection and ranging (LIDAR) is disclosed. The method comprises: obtaining 3-dimensional (3D) point cloud data through the LIDAR; performing ground separation processing on the 3D point cloud data to remove ground information; after the ground information is removed from the 3D point cloud data, performing object extraction processing on the 3D point cloud data to obtain a 3D point cloud chart that comprises a pedestrian candidate point cloud group; performing 2-dimensional (2D) mapping processing on the 3D point cloud chart to obtain a 2D chart; and extracting a 3D feature and a 2D feature from the 3D point cloud chart and the 2D chart, respectively, and utilizing the 3D feature and the 2D feature to determine a location of the pedestrian.

X, Y, and Z coordinates of the 3D point cloud data obtained through the LIDAR are normalized in order to remove repeatability and inconsistent dependency to protect data and make operations of the 3D point cloud data more flexible. The ground separation processing may utilize the Random Sample Consensus (RANSAC) to remove ground information. The RANSAC is different from a traditional method which obtains an initial solution according to as much data as possible for removing invalid data points. In contrast to the traditional method, the RANSAC may utilize a random available sample database to find consistency according to the 3D point cloud data to expand a set of ground data, and the method may further remove the set of ground data to remove the ground information within the 3D point cloud data.

The object extraction processing may utilize differences between points within the 3D point cloud data to perform grouping. For example, when a difference between two points is less than 0.2 m (but the present invention is not limited thereto), the two points may be classified into a same group, and the pedestrian candidate point cloud group is determined according to lengths, widths, and heights of respective point cloud groups.

The 2D mapping processing may comprise: applying mapping to the 3D point cloud chart to generate the 2D chart; removing noise of the 2D chart by utilizing binary image processing to dilate the 2D chart; removing noise of the 2D chart by utilizing Gaussian blur filtering to blur the 2D chart; utilizing morphology algorithm to obtain contours of respective objects within the 2D chart; and filling up regions of the respective objects within the 2D chart. The aforementioned steps may effectively remove noise, and make the pedestrian candidate point cloud group determined in the object extraction processing be enhanced and become more obvious in the 2D chart.

The step of utilizing the 3D feature and the 2D feature to determine the location of the pedestrian performs classification by utilizing the 3D feature and the 2D feature concurrently with aid of machine learning, and determines the location of the pedestrian according to a classification result.

The above summary and the following detailed description and accompanying drawings are for further illustrating means been taken in the present invention and effects been achieved. Such other objectives and advantages of the present invention will be provided in the subsequent description and the accompanying drawings.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a diagram illustrating a 3D point cloud chart and a 2D chart generated by 2D mapping processing according to an embodiment of the present invention.

DETAILED DESCRIPTION

Embodiments are provided to describe the method of the present invention, and those skilled in related art may readily understand advantages and effect of the present invention according to detailed descriptions provided as follows.

Laser beams emitted by the light detection and ranging (LIDAR) system may have high directivity without considering the influence of light environment. Emitting laser beams with high precision to scan obvious features around street environment can be helpful for detecting an object (e.g., a pedestrian) which is smaller than an automobile, and the above are widely discussed in current developments of self-driving technology.

The present invention utilizes a LIDAR system to emit electromagnetic radiation for detecting a distance of an object. Although the LIDAR system may have a 50 m detection range, when the detection distance increases, point cloud data may become sparser, where an obstacle may become hard to be recognized. More particularly, in nighttime or in the environment with awful weather situation, those figures with low resolution are usually unable to be clearly recognized. According to the experiences, although the detection distance of the LIDAR system may reach over 50 m, 3-dimensional (3D) point cloud data may have become quite sparse for the detection distance about 40 m, and an object that is far from the LIDAR system is hardly to be clearly recognized. Thus, an objective of the present invention is to improve detection of an exact location of a pedestrian that is far from the LIDAR system in a situation that only the LIDAR system is utilized. Since the location of the pedestrian can be detected in advance, a self-driving system may have enough reaction distance. Another objective of the present invention is to make the LIDAR system be capable of detecting information, such as shapes and distances of obstacles, in both of daytime and nighttime without being affected by lightness.

Figure 1:
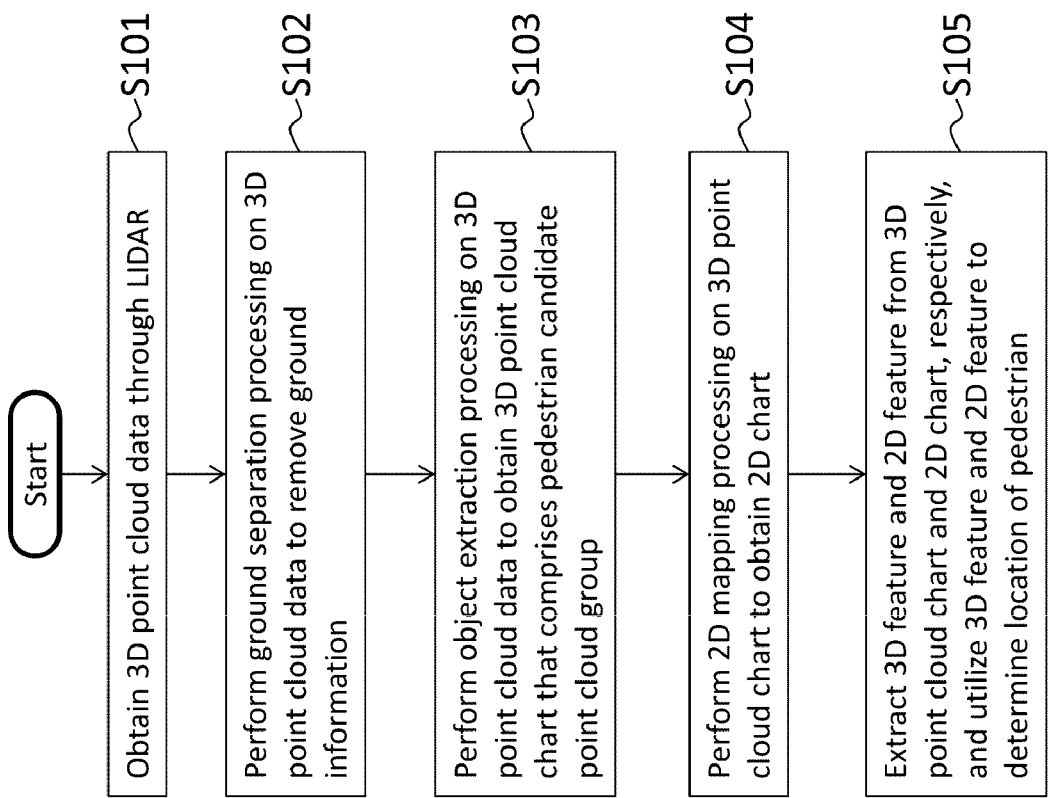
FIG. 1 is a flowchart of a method for performing pedestrian detection with aid of light detection and ranging (LIDAR) according to an embodiment of the present invention.

Please refer to FIG. 1, which is a flowchart of a method for performing pedestrian detection with aid of LIDAR according to an embodiment of the present invention. As shown in FIG. 1, the method may comprise the following steps.

In Step S101, 3D point cloud data is obtained through the LIDAR system, where the 3D point cloud data comprises normalized X, Y, Z coordinates.

In Step S102, ground separation processing is performed on the 3D point cloud data to remove ground information, where the ground separation processing utilizes a Random Sample Consensus (RANSAC) to remove the ground information.

In Step S103, after the ground information is removed from the 3D point cloud data, object extraction processing is performed on the 3D point cloud data to obtain a 3D point cloud chart that comprises a pedestrian candidate point cloud group, where the object extraction processing utilizes distances between different points within the 3D point cloud data to perform grouping.

In Step S104, 2-dimensional (2D) mapping processing is performed on the 3D point cloud chart to obtain a 2D chart.

In Step S105, a 3D feature and a 2D feature are extracted from the 3D point cloud chart and the 2D chart, respectively, and the 3D feature and the 2D feature are utilized to determine a location of the pedestrian.

First of all, the LIDAR system performs data collection. In this embodiment, the method utilizes the LIDAR system to obtain 3D point cloud data, and the method normalizes X, Y, and Z coordinates through pre-processing. The pre-processing (e.g., normalization processing) is arranged to remove repeatability and inconsistent dependency to protect data and make operations of the 3D point cloud data more flexible.

Second, the ground separation processing is performed. In this embodiment, the method may utilize the RANSAC to remove ground information. The RANSAC is different from the traditional method that obtains an initial solution according to as much data as possible for removing invalid data points. In contrast to the traditional method, the RANSAC may utilize a random available sample database to find consistency according to the 3D point cloud to expand a set of ground data, and the method may further remove the set of ground data to remove the ground information within the 3D point cloud data.

Third, the object extraction processing is performed. In this embodiment, the method performs grouping according to distances between different points within the 3D point cloud data. The method performs searching in a manner of K-D tree, where when a distance between two points is less than 0.2 m, the two points may be classified into a same group. Further, the pedestrian candidate point cloud group may be determined according to lengths, widths, and heights of respective point cloud groups.

Finally, classification processing is performed. In this embodiment, the method performs calculations and evaluations on feature vectors extracted from 3D features and mapping 2D features. Additionally, the method utilizes machine learning to recognize whether a group stands for a pedestrian. Detail implementation is described as follows. The method utilizes the 2D feature to increase precision and classify the detected 3D point cloud. The method extracts a candidate point cloud group according to the size of a pedestrian, and further extracts features from the 3D point cloud. In order to solve the problems of sparse points at a long detection distance, the method maps the 3D point cloud onto a 2D plane. In this process, the method may require calculating distances and angles of the 3D point cloud; and after rotating the 3D point cloud, the method maps the 3D point cloud onto the 2D plane. Additionally, the method performs contour determination and filling up a region of the contour to generate a 2D chart. The method further extracts corresponding 2D contour and related 2D feature thereof (e.g. histogram of oriented gradients (HOG) feature, local binary pattern (LBP) feature, and/or Haar-like feature). Finally, the method utilizes machine learning to perform classification based on the traditional 3D features and the proposed 2D features.

Figure 2:
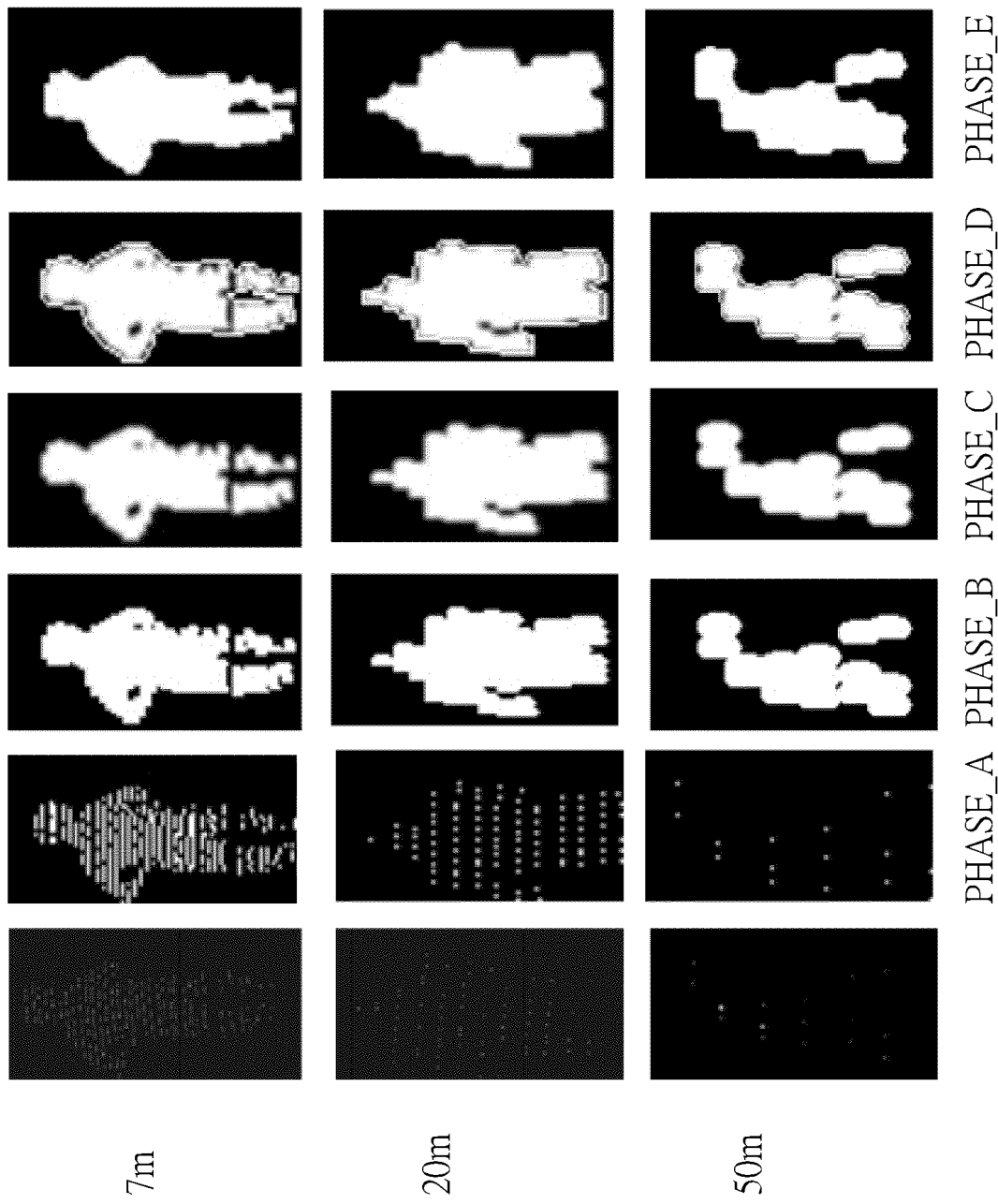
FIG. 2 is a diagram illustrating an example that operates according to a 2D mapping processing flow of the present invention.

Please refer to FIG. 2, which is a diagram illustrating an example operates according to a 2D mapping processing flow of the present invention, where the horizontal axis represents processing phases (e.g., phase {PHASE_A, PHASE_B, PHASE_C, PHASE_D, PHASE_E}) of a 2D mapping processing (which may be referred to as the processing, for brevity), and the vertical axis represents examples under different detection distance (e.g., 7 m, 20 m, and 50 m). As shown in FIG. 2, the 2D mapping processing of mapping the 3D point cloud onto the 2D plane to generate a 2D chart in the aforementioned embodiment may comprise the following steps.

As shown in the phase PHASE_A, the processing applies mapping to the 3D point cloud chart to generate the 2D chart. In this phase, the processing may require calculating distances and angles between the LIDAR system and the 3D point cloud, and after rotating the point cloud, the processing may map the 3D point cloud onto the 2D plane.

As shown in the phase PHASE_B, the processing removes noise of the 2D chart by utilizing binary image processing to dilate the 2D chart.

As shown in the phase PHASE_C, the processing removes noise of the 2D chart by utilizing Gaussian blur filtering to blur the 2D chart.

As shown in the phase PHASE_D, the processing utilizes morphology algorithm to obtain contours of respective objects within the 2D chart.

As shown in the phase PHASE_E, the processing fills up regions (spacing) of the respective objects within the 2D chart.

Please refer to FIG. 3, which is a diagram illustrating a 3D point cloud chart and a 2D chart generated according to the aforementioned 2D mapping processing. The 3D point cloud chart is illustrated in the sub-diagram (A) of FIG. 3. The 2D chart is illustrated in the sub-diagram (B) of FIG. 3. As shown in the upper-half portion of the 3D point cloud chart in FIG. 3, when a pedestrian is far from the LIDAR system, the collected point cloud may be quite spare. As a result, pedestrian(s) far from the LIDAR system may not be recognized by solely using 3D features. As shown in the upper-half portion of the 2D chart in FIG. 3, the method may apply mapping to the 3D point cloud to generate the 2D chart, and may further perform point supplementing according to the distance between the pedestrian and the LIDAR system. In this way, pedestrians far from the LIDAR system can be detected successfully.

The present invention provides a method for performing pedestrian detection with aid of LIDAR system. The system operating according to the method may greatly improve performance of the LIDAR system when detecting a far object, which may prevent related problems such as inaccuracy resulting from only relying on the 3D feature to perform pedestrian determination. Through the method of the present invention, precision of pedestrian detection with aid of LIDAR system can be improved. Additionally, a RGB-camera may be incorporated in the LIDAR system to further optimize performance of the LIDAR system, and further improve the precision. Thus, applications for self-driving system or related industry are expected to increase in the future. For example, the LIDAR system may be utilized in indoor space such as a large-scale automation factory. Through the method of the present invention, when a worker is near a moving region of a machine, the machine can automatically stop operating to ensure safety of the worker.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing pedestrian detection with aid of light detection and ranging (LIDAR), comprising:
   obtaining 3-dimensional (3D) point cloud data through the LIDAR;
   performing ground separation processing on the 3D point cloud data to remove ground information;
   after the ground information is removed from the 3D point cloud data, performing object extraction processing on the 3D point cloud data to obtain a 3D point cloud chart that comprises a pedestrian candidate point cloud group;
   performing 2-dimensional (2D) mapping processing on the 3D point cloud chart to obtain a 2D chart, wherein the 2D mapping processing comprises:
     applying mapping to the 3D point cloud chart to generate the 2D chart;
     removing noise of the 2D chart by utilizing binary image processing to dilate the 2D chart;
     removing noise of the 2D chart by utilizing Gaussian blur filtering to blur the 2D chart;
     utilizing morphology algorithm to obtain contours of respective objects within the 2D chart; and
     filling up regions of the respective objects within the 2D chart; and
   extracting a 3D feature and a 2D feature from the 3D point cloud chart and the 2D chart, respectively, and utilizing the 3D feature and the 2D feature to determine a location of the pedestrian.

2. The method of claim 1, wherein the 3D point cloud data comprises normalized X, Y, Z coordinates.

3. The method of claim 2, wherein the ground separation processing utilizes a Random Sample Consensus to remove the ground information.

4. The method of claim 3, wherein the object extraction processing utilizes differences between points within the 3D point cloud data to perform grouping.

5. The method of claim 4, wherein when a difference between two points is less than 0.2 m, the two points are classified into a same group, and the pedestrian candidate point cloud group is determined according to lengths, widths, and heights of respective point cloud groups.

6. The method of claim 5, wherein the 2D feature is a histogram of oriented gradients (HOG) feature, a local binary pattern (LBP) feature, a Haar-like feature, or a combination thereof.

7. The method of claim 6, wherein utilizing the 3D feature and the 2D feature to determine the location of the pedestrian comprises:

performing classification by utilizing the 3D feature and the 2D feature concurrently with aid of machine learning; and determining the location of the pedestrian according to a classification result.

\* \* \* \* \*